United States Patent

Mayer et al.

[11] Patent Number: 5,908,896
[45] Date of Patent: Jun. 1, 1999

[54] ORGANIC AEROGEL MICROSPHERES

[75] Inventors: Steven T. Mayer, San Leandro; Fung-Ming Kong, Pleasanton; Richard W. Pekala, Pleasant Hill; James L. Kaschmitter, Pleasanton, all of Calif.

[73] Assignee: The Regents of the University of California, Oakland, Calif.

[21] Appl. No.: 08/586,038

[22] Filed: Jan. 16, 1996

Related U.S. Application Data

[62] Division of application No. 08/089,119, Jul. 8, 1993, Pat. No. 5,508,341.

[51] Int. Cl.[6] .................................................. C01B 31/00
[52] U.S. Cl. .......................... 524/596; 523/336; 523/337; 523/339; 521/181; 428/402; 502/418
[58] Field of Search ............................ 524/596; 513/336, 513/337, 339; 521/181; 428/402; 502/418

[56] References Cited

U.S. PATENT DOCUMENTS

| | | | |
|---|---|---|---|
| 5,172,278 | 12/1992 | Tutt | 359/885 |
| 5,227,239 | 7/1993 | Upadhye et al. | 428/402 |
| 5,234,475 | 8/1993 | Malhotra et al. | 44/282 |
| 5,260,855 | 11/1993 | Kaschmitter et al. | 361/502 |
| 5,269,953 | 12/1993 | Whewell | 252/30 |
| 5,381,149 | 1/1995 | Dougherty et al. | 342/1 |
| 5,402,306 | 3/1995 | Mayer et al. | 361/582 |
| 5,420,168 | 5/1995 | Mayer et al. | 521/99 |

*Primary Examiner*—Marion McCamish
*Assistant Examiner*—John J. Guarriello
*Attorney, Agent, or Firm*—L. E. Carnahan

[57] ABSTRACT

Organic aerogel microspheres which can be used in capacitors, batteries, thermal insulation, adsorption/filtration media, and chromatographic packings, having diameters ranging from about 1 micron to about 3 mm. The microspheres can be pyrolyzed to form carbon aerogel microspheres. This method involves stirring the aqueous organic phase in mineral oil at elevated temperature until the dispersed organic phase polymerizes and forms nonsticky gel spheres. The size of the microspheres depends on the collision rate of the liquid droplets and the reaction rate of the monomers from which the aqueous solution is formed. The collision rate is governed by the volume ratio of the aqueous solution to the mineral oil and the shear rate, while the reaction rate is governed by the chemical formulation and the curing temperature.

13 Claims, No Drawings

ORGANIC AEROGEL MICROSPHERES

This is a Division of application Ser. No. 08/089,119 now U.S. Pat. No. 5,508,341 filed Jul. 8, 1993.

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to organic aerogels, particularly to aerogel microspheres, and more particularly to resorcinol-formaldehyde, carbon, and melamine-formaldehyde microspheres and a method of fabrication which involves inverse emulsion polymerization, wherein the size and structure of the microspheres is determined by the chemical formulation and processing parameters.

Aerogels are a special class of open-cell foams with unique thermal, acoustic, optical, and electrical properties. Foamed organic polymers and organic foam composite materials are known and used in the insulation, construction, and similar industries. Also, machinable and structurally stable low density, microcellular carbon foams and catalyst-impregnated carbon foams are known. In addition, electrically conductive, open-celled, low density, micro-cellular carbon foam has been developed. Development efforts have also been directed to low density aerogels which may be carbonized to form low density carbon foams with a cell size of $\leq 0.1$ micron for use in high-energy physics applications, waste management, such as adsorption of fluids and toxic gases, ion exchangers, and supports for metal catalysts, etc., as exemplified by U.S. Pat. Nos. 4,873,218 issued Oct. 10, 1989; 4,997,804 issued Mar. 5, 1991; and 5,086,085 issued Feb. 4, 1992, each to R. W. Pekala, and paper UCRL-99846, "Resorcinol-Formaldehyde Aerogels And Their Carbonized Derivatives", by R. W. Pekala et al., Oct. 24, 1988. High density, micro-cellular carbon foams of this type have also been developed for use, for example, in electrochemical double layer supercapacitor applications, as described and claimed in copending U.S. application Ser. No. 07/822,438 filed Jan. 17, 1992, entitled "Supercapacitors Based On Carbon Foams", now U.S. Pat. No. 5,260,855 issued Nov. 9, 1993. Recently, high density carbon aerogels are being developed in a much wider variety of applications, such as in energy storage and energy conversion devices, adsorption/filtration media, electrochemical double-layer desalination, dilute solution metal recovery, hazardous waste treatment, and chromatographic packings.

Thus, while there has been substantial effort directed toward the development of foams and aerogels for use in energy storage devices (capacitors, rechargeable batteries, fuel cells), hazardous waste water treatment, catalyst supports, and insulation and construction applications, the processes for producing these materials have resulted in the formation of large monolithic pieces, slabs or chunks. More recent efforts have been directed to forming organic aerogels and then chopping or grinding the aerogel to produce particles which are mixed with a binder to produce a composite, exemplified by U.S. application Ser. No. 08/057, 739, filed May 4, 1993, and entitled "An Aquagel Electrode Separator For Use In Batteries And Supercapacitors", now U.S. Pat. No. 5,402,306 issued Mar. 28, 1995. Also, it has been recently discovered that the aerogels can be doped with various dopants during the fabrication process, as described and claimed in copending U.S. application Ser. No. 08/041, 507, filed Apr. 1, 1993, and entitled "Doping Of Carbon Foams For Use In Energy Storage Devices", now U.S. Pat. No. 5,358,802 issued Oct. 25, 1994. It has been recognized that the formation of organic aerogel foam in small spheres (microspheres) would greatly expand the use of these materials, as well as reduce the process time and equipment costs in applications where they would be appropriate. For example, for energy storage applications, the microspheres have the advantage over slabs of aerogels by allowing greater mechanical flexibility of a composite electrode, or may, using an appropriate binder be used in a single cell, low voltage "jelly roll" cell, similar to conventional "AA", "C" or "D" cells, but with lighter weight. Aerogel microspheres are also useful in packed bed reactors (chromatographic packings, deionization processes, etc.) in that connective flow through the bed can occur with relative ease (when compared to flowing fluid through a monolithic slab), while maintaining a very high surface area packing. In addition, the aerogel micropheres may be utilized in air filtration and medical applications, as well as in energy storage applications, such as in a double-layer capacitor.

The present invention provides a method for producing microspheres of organic aerogel foam, and thus advances this field of technology by enabling such foam to be used in various applications not suitable or cost effective for aerogel monoliths.

As the result of further research and development, it has been recognized that organic aerogel microspheres can be produced in a wide range of spherical diameters, densities, and surface areas, by controlling the chemical formulation and processing conditions and procedures wherein the aqueous solution is stirred in a material in which the aerogel reactants and products are insoluble, such as mineral oil or cyclohexane, during the polymerization/gelation phase of the process. Thus, the present invention improves on the state of the organic aerogel art by providing control over the size of the aerogel microspheres, either doped or undoped in the organic or carbonized state, and a method for forming the microspheres.

SUMMARY OF THE INVENTION

It is an object of the present invention to provide organic aerogel microspheres.

A further object of the invention is to provide a method for the fabrication of organic aerogel microspheres.

A further object of the invention is to provide a method for the formation of organic aerogel foam microspheres by an inverse emulsion polymerization.

A further object of the invention is to provide doped organic aerogel or carbon aerogel microspheres.

Another object of the invention is to provide a method for producing resorcinol/formaldehyde, catechol/formaldehyde, phenol/resorcinol/formaldehyde, phloroglucinol/formaldehyde, phenol/formaldehyde, and melamine/formaldehyde aerogel microspheres which may be lithium, phosphorous, or boron doped and/or carbonized.

Another object of the invention is to provide a method for producing organic aerogel microspheres having diameters in the range of about 1 $\mu$ to about 3 mm, with a density in the range of about 0.05 to 1.2 g/cc.

Another object of the invention is to provide a method for producing organic aerogel microspheres which allows for mechanical flexibility of a composite electrode utilizing same.

Another object of the invention is to provide a method for producing organic aerogel microspheres which can be combined with a binder to produce an electrode suitable for "jelly roll" electrochemical cells.

Other objects and advantages will become apparent from the following description which sets forth the principles upon which this invention is based, as well as a detailed example for producing microspheres of organic aerogel foam. Basically, the invention involves the formulation of organic aerogel microspheres by inverse emulsion polymerization in the range of about 1 $\mu$ to about 3 mm in diameter, and which can be pyrolyzed to produce doped or undoped carbon aerogel microspheres. The microspheres are produced by a method which enables the size and structure of the microspheres to be determined by the processing procedures and the chemical formulation. Also, the microspheres may be doped during the fabrication process, and carbonized or pyrolyzed to produce carbon aerogel microspheres. Microspheres of the type produced by this invention have applications in ICF targets, energy storage devices, such as capacitors and batteries, energy conversion devices, such as fuel cells, adsorption/filtration media (waste treatment, deionization, desalination, metal recovery), chromatographic packing, catalyst supports, thermal insulation, and adsorbents for oil spill clean-up, for example. The advantage of the carbon aerogel microspheres for flow through electrodes is that the electrode can be made "macroporous" as in a packed bed reactor (adsorption/filtration, catalyst supports, and chromatographic packing), with flow occurring between the microspheres with minimal resistance, but still maintain the high surface area/volume needed for the application. The composite electrode containing aerogel microspheres provides mechanical flexibility compared to a slab or monolith of the same aerogel.

DETAILED DESCRIPTION OF THE INVENTION

The present invention is directed to organic aerogel microspheres which can be doped and/or carbonized, and to a method for fabricating the microspheres. Aerogel microspheres, like monolithic aerogels constitute a special class of open-cell foams with unique thermal, acoustic, optical, and electrical properties, and thus, as pointed out above, have a wide variety of uses. Further, electrodes, for example, fabricated from aerogel microspheres provide a mechanical flexibility in addition to the other characteristics thereof.

The formulation of the organic aerogel foam microspheres is generally similar to the chemistry described and claimed in the above-referenced U.S. patents by R. W. Pekala and the above-referenced copending U.S. application Ser. No. 07/822,438, but in the fabrication process of this invention, the aqueous reactant solution (referred to as the "aqueous phase") is mixed with an excess of a non-miscible solvent (referred to as the "oil phase") to form a colloidal suspension. A surfactant, such as sorbitan monoleate, is sometimes used to stabilize the suspension. The properties of the "oil phase" are such that: 1) all of the reactants and the water of the aqueous phase are insoluble or nearly insoluble in the oil phase, 2) the oil phase is thermally stable in the temperature range from 0 to 100° C., and 3) the "oil phase" has a low to moderate vapor pressure in the same temperature range. Examples of the "oil phase" include mineral oil, moderate to long chain saturated hydrocarbons (e.g. hexane, heptane, p-xylene, octane), cyclohexane, and long chain alcohols (e.g. 1-octanol).

While specific resorcinol/formaldehyde (RF) formulations in cyclohexane or mineral oil will be exemplified hereinafter, other formulations are possible, depending on the desired properties of the user. The process, in general, requires first that the reactants are mixed together and with a catalyst. The reactants include dihydroxy or trihydroxy benzene compounds (e.g. resorcinol, catechol, phloroglucinol, 1,3-dihydroxynaphthlene) or melamine, or mixtures of these compounds that react (by condensation and addition polymerization) in the appropriate molar ratio with an aldehyde (e.g. formaldehyde, furfural or mixtures of aldehydes) in the presence of a base catalyst (typically $Na_2CO_3$). In addition to the combination of resorcinol-formaldehyde, exemplified hereinafter, preferred combinations of reactants include resorcinol-furfural, phenol-resorcinol-formaldehyde, catechol-formaldehyde, phloroglucinol-formaldehyde, and melamine/formaldehyde. In the method of this invention the aqueous phase containing the reactant/catalyst mixture is partially polymerized in a beaker to near the gel point and then slowly added to an excess of the oil phase (properties described above) such as mineral oil, while being continuously stirred or agitated. In some cases a soap (e.g. sorbitan monoleate) can be added to alter or stabilize the interfacial tension and aid in the dispersion of the aqueous phase. The mixture is heated at an elevated temperature (20 to 100° C.) and agitated or stirred (e.g. using a mechanical mixer, magnetic stirring bar) to form a colloidal suspension of aqueous phase droplets in a continuous oil phase. Stirring is continued until the aqueous phase undergoes gelation and the crosslinked gel spheres are formed. The agitation can be done by appropriate vibration as well as by stirring. The size of the spheres formed depends on the collision rate of the liquid droplets, and the reaction rate of the monomers from which the aqueous solution is composed. The collision rate is governed by the volume ratio of the aqueous solution to the mineral oil, and the shear rate. The reaction rate is governed by the chemical formulation of the aqueous solution and the curing temperature. After the gelation/polymerization is complete, the mixture (now containing water filled microspheres in an oil phase) is filtered. Typically, the surfactant and/or oil stick to the surface of the microspheres and must be removed by a solvent (referred to hereafter as a "cleaning agent"). For example, when mineral oil is used as the oil phase, toluene can be used as a cleaning agent to remove the mineral oil from the microspheres' surface. To remove the water from within the microspheres, the microspheres are washed with a solvent (exchange solvent) that is compatible with the water in the pores of the microsphere. The exchange solvent may be, for example, acetone, methanol or other organic solvents that are miscible with water. In some cases the action of the cleaning agent and the exchange solvent may be combined. In addition, when producing high density (>0.55 g/cc) aerogel microspheres, it is generally desirable for the exchange solvent to have a low solid/liquid interfacial surface-tension so that a low pressure evaporative drying procedure can be used. See U.S. application Ser. No. 08/041,503 filed Apr. 1, 1993, entitled "Method Of Low Pressure And/Or Evaporative Drying Of Aerogel", now U.S. Pat. No. 5,420,168 issued May 30, 1995 for example. Otherwise, it is desirable that the exchange solvent be soluble in liquid or supercritical carbon dioxide (e.g. methanol, acetone) so that the microspheres can be dried under supercritical or subcritical conditions as exemplified by U.S. Pat. Nos. 4,873,218 issued Oct. 10, 1989 and 4,997,804 issued Mar. 5, 1991, each to R. W. Pekala, and paper UCRL-99846, "Resorcinol-Formaldehyde Aerogels And Their Carbonized Derivatives", by R. W. Pekala et al., Oct. 24, 1988. The resulting organic aerogel microspheres can then be pyrolyzed in an inert atmosphere to form carbon aerogel microspheres. If the RF microspheres are pyrolyzed at elevated temperatues (600–1200° C.) in a controlled oxidizing atmosphere (e.g. steam, air, $CO_2$ or mixtures of an inert gas therewith), "activated" carbon microspheres result. These carbon microspheres have a different pore size distribution and higher surface area than RF microspheres pyrolyzed in an inert gas flow (e.g. nitrogen).

A further aspect of this invention involves a simple method for doping the microsphere with lithium, phosphorous, boron, aluminum and arsenic. This method, for example, involves making lithium doped organic and lithium doped carbon aerogel microspheres. For example, microspheres have been fabricated from resorcinol/formaldehyde (RF) aerogels, which have been doped with a lithium salt. In the case of lithium-doped RF aerogel microspheres, they have been pyrolyzed in an inert atmosphere to form lithium-doped carbon aerogel microspheres. This method involves stirring the aqueous RF phase containing a lithium salt (e.g. $Li_2CO_3$) in an oil phase (as described above) at elevated temperatures (20 to 100° C.) until the dispersed aqueous phase polymerizes and forms gel spheres. A surfactant may be used to stabilize the suspension if desired. RF and carbon microspheres with diameters ranging from ~5 $\mu$ to ~3 mm have been produced by this method. The following is a detailed description and examples of the method used in the verification of this invention:

EXAMPLE 1

A 500 ml-sized (HDPE) plastic bottle was partially filled with mineral oil (about 100 ml), 25 ml of the aqueous reactant phase solution, containing the reactants: 1.60 g resorcinol, 2.32 g 37% formaldehyde, 0.72 g 0.1M sodium carbonate solution, and 20.35 g distilled and deionized (DDI) water were added to the mineral oil. This RF formulation is designated as 10%/wt reactants (or R100) and having resorcinol (or any other multifunctional monomer previously described) to catalyst (R/C) molar ratio of 200 (designated R/C200). An R/C ratio as defined herein is the ratio of the resorcinol, catechol, phenol, etc. to the catalyst. In the examples described therein, the R/C ratio is the ratio of resorcinol to catalyst. Next, the bottle was completely filled with mineral oil to the rim. Air bubbles in the mixture were removed to prevent their entrapment in the gel spheres. The bottle was place in a 70° C. water bath and the mixture was stirred (agitated) with a magnetic stirrer at an intermediate speed. After checking that the mixture was being stirred evenly, and the dispersed droplets were of the desired size, the bottle was capped. Agitation by heating and stirring were continued until the aqueous phase had undergone gelation and hardened (in this case, for about 1 hr). The heating and stirring procedure lasts from at least 10 minutes and up to 1–8 hours, depending on particular temperature, catalyst concentration, the monomer concentration and whether or not the RF solution was pre-polymerized. The microspheres formed under the above procedure are from about 1 to 2 mm in diameter. The spheres were then cured in mineral oil at 95° C. for three days, and then washed in toluene for a day. However, depending on the RF or other formulation, the curing temperature may range from 20–95° with a time period of 1 hour to about 3 days. The curing temperatures must be below the boiling point of water, for example, where the solution is aqueous. Following the washing, the microspheres had the water in their pores leached with acetone for a period of up to two days, whereafter they were subjected to supercritical drying with carbon dioxide. The temperatures and time periods may be varied depending on the processing involved. The example here is for laboratory varification, and a production process may be slightly different. The supercritical drying process is well known and exemplified in the above-reference U.S. Patents.

EXAMPLE 2

A 500 ml-sized (HDPE) plastic bottle was partially filled with mineral oil (about 100 ml). About 50 ml of the aqueous reactant phase solution, containing the reactants: 24.7 g resorcinol, 35.8 g 37% formaldehyde, 11.2 g 0.1M sodium carbonate solution, and 0.0 g (zero) distilled and deionized (DDI) water, were added to the mineral oil. This RF formulation is designated as 60%/wt reactants (or R600) and having resorcinol to catalyst molar ratio of 200 (designated R/C200). Next, the bottle was completely filled with mineral oil to the rim. Air bubbles in the mixture were removed to prevent their entrapment in the gel spheres. The bottle was placed in a 50° C. water bath and the mixture was stirred with a magnetic stirrer at an intermediate speed. After checking that the mixture was being stirred evenly, and the dispersed droplets were the desired size, the bottle was capped. Heating and stirring were continued until the aqueous phase had undergone gelation and hardened (in this case, for about 1 hr). The microspheres formed under the above procedure were from about 1 to 2 mm in diameter. The microspheres were then cured in mineral oil at 95° C. for three days, and then washed in toluene for a day. The cure temperature and time may vary as above described. Following the washing, the microspheres had the water in their pores leached with acetone, whereafter they were subjected to an air drying procedure, in contrast to the time-consuming and more expensive supercritical drying process. The air drying process is describe in detail and exemplified in the above-referenced copending U.S. patent application Ser. No. 08/041,503.

EXAMPLE 3

Mix 12.35 grams of resorcinol, 17.91 grams of formaldehyde, 13.9 grams of deionized water, and 22.32 grams of 0.1M sodium carbonate to form an aqueous solution of a 2:1 molar ratio of formaldehyde to resorcinol and a 30% weight/volume (w/v) fraction of reactants, such that the resorcinol to catalyst ratio is R/C=50. Mix 20 ml of the thus formed aqueous solution with an excess of a non-polar, water insoluble solvent such as 200 ml of cyclohexane. Add a small amount (0.25–0.50) of a surfactant, such as sorbitan monoleate, to the thus formed mixture as an emulsion stabilizer. This mixture is then stirred vigorously, at a temperature of 65–70° C., which results in the formation of an inverse emulsion with the oil phase being continuous, and the resorcinol/formaldehyde (RF) mixture forming the non-continuous aqueous droplet phase, which results in the formation of droplets of an RF gel. After about five (5) hours (the time depending on the RF formulation and temperature), the gel droplets have hardened in a spherical configuration, and the stirring is stopped, thereby forming RF microspheres, with the size depending on the agitation rate. The mixture is then filtered to remove the microspheres from the cyclohexane and to obtain a desired size (1–1000 $\mu$m), and washed with a solvent, such as acetone, to remove the cyclohexane and concurrently exchange the water in the RF gels (aquagels) with acetone. Next, the acetone is exchanged with liquid carbon dioxide, and a supercritical or non-supercritical extraction of the acetone with carbon dioxide results in solvent-free RF microspheres. As in example 2, air drying may be utilized.

EXAMPLE 4

Composed of highly aromatic rings, the RF aerogel microspheres can be further processed, where required, by pyrolyzing at 1050° C. in nitrogen for a time period of 4 hrs., for example, to form carbon aerogel microspheres. The pyrolysis process is described in detail and exemplified in the above-referenced U.S. patents. Samples processed as described in examples 1 and 2 were processed in such a manner. The estimated density of the resultant carbon microspheres were ~0.15 g/cc (example 1) and ~0.85 g/cc (example 2). In general, the pyrolysis temperature may range from about 500–3000° C. depending on the carbon properties desired, and pyrolysis may occur in other inert atmospheres, such as argon, neon, or helium. High firing temperature typically give rise to more ordered structures, but in the case of the organic aerogels described above, do not yield graphitic materials. Also, the final density after pyrolysis may range from about 0.05–1.2 g/cc depending on the density and composition of the organic precursor. The diameter of the microspheres may range from about 1 $\mu$ to about 3 mm.

EXAMPLE 5

The method used above to produce RF aerogel microspheres has been used to produce MF aerogel microspheres by changing the organic solution formulation, as such formulation is exemplified in above-referenced U.S. Pat. No. 5,086,085.

Other RF formulations having reactant concentrations from 3–70% w/v (weight/volume) can be used. Also, R/C ratio in the range of from about 50–400 may be utilized. In addition, other reactant/catalyst formulations, as described above and as set forth in the above-referenced U.S. Patent and U.S. application Ser. No. 07/822,438, which are incorporated herein by reference, may be utilized to produce to aerogel microspheres. Also, the dopant may, in addition to lithium, be phosphorous or boron, for example, as described in above referenced copending U.S. application Ser. No. 08/041,507, filed Apr. 1, 1993, entitled "Doping of Carbon Foams For Use In Energy Storage Devices". Finally, the catalyst in the aqueous RF solution may be other alkali metal salts of weak acids (e.g. lithium carbonate and potassium carbonate).

It has thus been shown that the result of the present invention is organic aerogel microspheres which can be produced in a doped or undoped fashion, and which (with the exception of melamine/formaldehyde formulation) can be carbonized if desired. These microspheres can be produced in sizes ranging from ~1 $\mu$ to ~3 mm, with densities of about 0.05–1.2 g/cc from reactant concentrations of from 3 to 70% (R30 to R700) and with resorcinol to catalyst molar ratios (R/C ratio) of about 50–400.

While particular embodiments, materials, solvents, parameters, etc. have been described to illustrate the principles of this invention, such is not intended to be limiting. Modifications and changes will become apparent to those skilled in the art, and it is intended that the invention be limited only by the scope of the appended claims.

We claim:

1. An organic aerogel microsphere having a density in the range of about 0.05–1.2 g/cc, a diameter in the range from about 1 $\mu$ to about 3 mm, and an R/C ratio of about 50–400.

2. The microsphere of claim 1, additionally including a dopant selected from the group of lithium and phosphorous.

3. The microsphere of claim 1, additionally including a dopant selected from the group of boron, arsenic and aluminum.

4. The microspheres of claim 1, additionally including a dopant.

5. A carbon aerogel microsphere having a density in the range of about 0.05–1.2 g/cc, a diameter in the range from about 1 $\mu$ to about 3 mm, formed by pyrolyzing an organic aerogel microsphere having an R/C ratio of about 50–400 in either an inert or oxidizing atmosphere at a temperature range of about 500–3000° C.

6. Organic aerogel microspheres having a density in the range of about 0.05–1.2 g/cc, and a diameter in the range of about 1 $\mu$ to about 3 mm.

7. The organic aerogel microspheres of claim 6, additionally including a dopant.

8. The organic aerogel microspheres of claim 6 additionally including a dopant selected from the group consisting of lithium and phosphorous.

9. The organic aerogel microspheres of claim 6 additionally including a dopant selected from the group consisting of boron, arsenic, and aluminum.

10. Carbon aerogel microspheres having a density in the range of about 0.05–1.2 g/cc, and a diameter in the range of about 1 $\mu$ to about 3 mm, produced by pyrolyzing organic aerogel microspheres.

11. Carbon aerogel microspheres having a density in the range of about 0.05–1.2 g/cc, and a diameter in the range of about 1 $\mu$ to about 3 mm, produced by pyrolyzing organic aerogel microspheres in an inert or oxidizing atmosphere.

12. Organic aerogel microspheres.

13. Carbon aerogel microspheres formed by pyrolyzing organic aerogel microspheres.

* * * * *